June 21, 1960
D. A. LONG
2,941,270
PERMANENTLY LOCKING SNAP FASTENER
Filed July 10, 1958
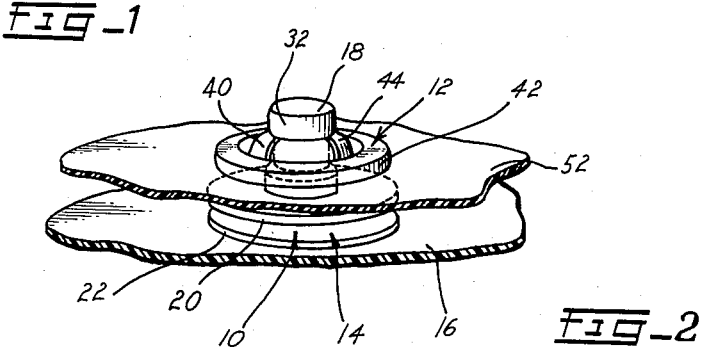
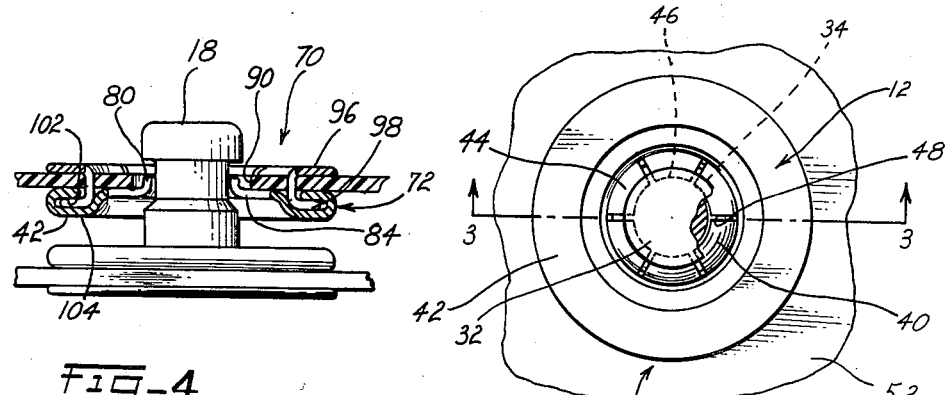
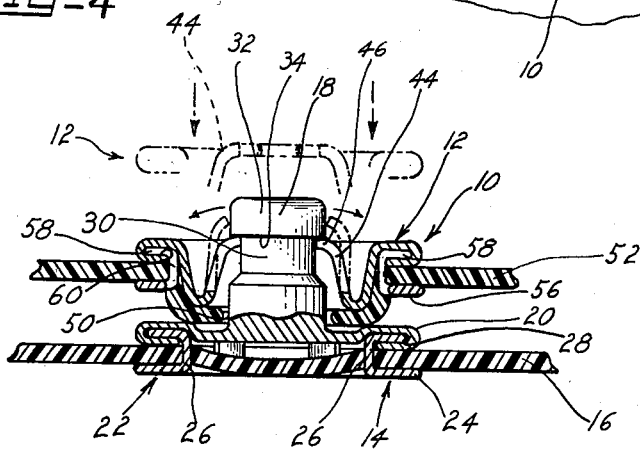
DONALD A. LONG
INVENTOR.
BY Thomas P. Mahoney
ATTORNEY United States Patent Office 2,941,270
Patented June 21, 1960

2,941,270

PERMANENTLY LOCKING SNAP FASTENER

Donald A. Long, Burbank, Calif., assignor to Precision Dynamics Corporation, Burbank, Calif., a corporation of California Filed July 10, 1958, Ser. No. 747,717

4 Claims. (Cl. 24—217)

This invention relates to a snap fastener and, more particularly, to a snap fastener which, once the component parts thereof are operatively engaged, cannot have said component parts released from each other by ordinary means. Therefore, when the component parts of the snap fastener are mounted on initially separable elements, once the component parts are engaged they will permanently retain the separable elements in operative engagement and prevent the separation thereof from each other.

Snap fasteners are conventionally utilized as closures for garments and the like, but there are fields of application where snap fasteners would be utilized but for the fact that conventional snap fasteners can have the component parts thereof disengaged from operative relationship with each other after they have been engaged with each other. Therefore, in such applications as seat covers and the like, in public transportation vehicles, the use of conventional snap fasteners is not feasible since the traveling public can easily release the fasteners and tamper with the seat covers.

Similarly, snap fasteners of the conventional type have been utilized in identification bracelets for hospital and other identification uses, but patients can readily separate the component parts of the snap fasteners, either deliberately or inadvertently, and remove the identification bracelets from their wrists.

It is, therefore, an object of my invention to provide a snap fastener which includes mating component parts adapted, when once engaged with each other, to be permanently retained in operative engagement and to resist the application of forces customarily applied in separating conventional snap fasteners. The provision of a permanently locking snap fastener of the character of that disclosed hereinbelow makes it feasible to use snap fasteners in many environments where conventional, readily disengageable, snap fasteners cannot be applied.

For instance, in the identification bracelet field, it is now possible to utilize snap fasteners of my invention and be assured that the identification bracelets incorporating the same cannot be removed from the wrists of patients wearing the bracelets unless the bracelet itself is cut or otherwise destroyed. Thus, the facility of engagement characteristic of the interengaging component parts of conventional snap fasteners is retained in my invention, but the separability of said component parts is eliminated.

Other objects and advantages of my invention will be apparent from the following specification and the accompanying drawing which is for the purpose of illustration only and in which:

Fig. 1 is a perspective view showing the component parts of the snap fastener of my invention applied to two separate pieces of fabric which are permanently engaged with each other by said snap fastener;

Fig. 2 is a top plan, partially sectional, view of the snap fastener of my invention;

Fig. 3 is a vertical, sectional view taken on the broken line 3—3 of Fig. 2; and Fig. 4 is a vertical, sectional view of an alternative form of the snap fastener of my invention.

Referring to the drawing, I show a snap fastener 10 constructed in accordance with the teachings of my invention and including interengageable top and bottom parts 12 and 14. The bottom part 14 is adapted to be secured to fabric 16, or other material, in the manner shown in the drawing, and includes a stud 18 having a base 20 which is maintained in operative engagement with the upper surface of the fabric 16 by securement means 22.

The securement means 22 is constituted by an annular ring 24 having right-angularly bent prongs 26 thereupon adapted to engage in a recess 28 provided in the base 20. The stud 18 is formed integrally with the base 20 and located centrally thereof and has a reduced shank 30 which terminates in an enlarged head 32 at the upper extremity of the shank, said head defining a radially extending shoulder or land 34, for a purpose which will be described in greater detail below.

The top part 12 of the snap fastener 10 includes a spring catch 40 which is constituted by an annular ring 42, said ring including a plurality of inwardly biased spring fingers 44 which, as best shown in Figs. 2 and 3 of the drawing, are provided with substantially right-angularly bent upper portions 46 which have their upper surfaces disposed in contact with the adjacent surface of the shoulder or land 34 and have their extremities contiguous to the perimetrical surface of the reduced shank 30 of the stud 18. The inner extremities of the right-angularly bent portions 46 of the spring fingers 44 are, as best shown in Fig. 2 of the drawing, slightly arcuate to conform to the circular configuration of the perimetrical surface of the reduced shank 30 and are separated from each other by slots 48.

The arcuate extremities of the right-angularly bent portions of the spring fingers 44 define a circular opening for the reception of the shank 30 of the stud 18 and said opening is substantially coincident with an opening 50 in the fabric 52 to which the spring catch 40 is secured by means of securement means constituted by a ring 56 having right-angularly bent prongs 58 thereupon engaging in a corresponding perimetrical recess 60 in the ring of the spring catch.

Of course, while the top and bottom portions 12 and 14 of the fastener 10 have been disclosed as mounted in fabrics adapted to be secured to each other, the utilization of the fastener 10 of the invention is not to be limited to any particular application since, as previously indicated, the fastener 10 of my invention is adapted to be incorporated in any type of material where its use is indicated.

In operatively engaging the top portion 12 of the fastener 10 upon the bottom portion 14 thereof, the upper extremity or head 32 of the stud 18 is inserted through the opening 50 in the fabric 52 and through the opening defined by the arcuate inner extremities of the right-angularly bent portions 46. When this occurs, the head 32 of the stud 18 displaces the right-angularly bent portions 46 outwardly in the manner illustrated in Fig. 2 of the drawing, and when the head portion has passed through the opening defined by the arcuate inner extremities of the right-angularly bent portions 46 of the spring fingers 44, the inner extremities of said right-angularly bent portions snap inwardly into the positions shown in Figs. 2 and 3 of the drawing wherein the upper surfaces thereof underlie the contiguous surface of the radially directed annular shoulder or land 34 and wherein the ends thereof are disposed in contiguity to the perimetrical surface of the shank 30.

When the right-angularly bent portions 46 of the spring fingers 44 are so engaged, the displacement of the stud 18 from operative engagement with the fingers 44 is not possible by ordinary means. This is attributable to the fact that when an axial force is imposed upon the stud 18 by an attempt to separate the stud from operative engagement with the spring fingers 44, the spring fingers 44 are subjected to a load slightly tangential to said axis and tend to bight more deeply into the perimetrical surface of the shank 30 while impinging more intimately upon the annular shoulder or land 34. Thus, the spring catch 40 constituting the top part 12 of the spring fastener 10 is permanently locked upon the bottom part 14 and, more particularly, the stud 18 incorporated in the same.

An alternative embodiment 70 of the snap fastener of my invention is shown in Fig. 4 of the drawing. Since the stud 18 of the snap fastener 70 is identical with that incorporated in the snap fastener 10, no detailed description thereof will be presented herein, identical reference numerals being utilized to designate the same parts of the stud as were utilized in describing the snap fastener 10.

The top part 72 of the snap fastener 70 includes a spring catch 80 which is constituted by an annular ring 82 including a plurality of slightly inclined, radially directed spring fingers 84 whose inner extremities are arcuately shaped to conform to the peripheral configuration of the reduced shank 30 of the stud 18 and engage under the radially extending shoulder or land 34 provided on the stud 18.

The arcuate extremities of the spring fingers 84 define a circular opening for the reception of the shank 30 of the stud 18 which is coincident with an opening 90 in the fabric 52 to which the spring catch is secured by means of securement means including a ring 96 having right-angularly bent prongs 98 thereupon engaging in a corresponding recess 102 in the ring constituting the base 104 of the top part 72 of the fastener 70.

Once the spring fingers 84 are engaged under the land 34 on the stud 18, removal of the stud 18 from operative engagement therewith is not possible without completely destroying the snap fastener 70. Therefore, when the snap fastener 70 is incorporated in an identification bracelet, or similar device, and an attempt is made to separate the stud from operative engagement with the top part 72 thereof by exerting an axial force on the stud 18, such an axial force will cause the fingers 84 to more intimately engage the stud 18 since, as they are bent downwardly against their normal, upward bias, the inner extremities thereof will be urged into engagement with the periphery of the shank 30 of the stud 18.

I thus provide by my invention a snap fastener which is usable with the facility of ordinary snap fasteners but which will, when the component parts thereof are once engaged, remain permanently locked to prevent separation of said component parts. Therefore, snap fasteners of my invention can be utilized in environments where conventional snap fasteners are not applicable and to retain various articles in permanent and operative engagement with each other.

I claim:

1. In a snap fastener adapted to be closed and to remain permanently closed against any attempt to dislodge the component parts thereof by ordinary means, the combination of: a bottom part including a vertically oriented stud having a base including securement means adapted to retain said base in operative engagement with a supporting element, said stud having a radially extending circular land at its upper extremity adapted to serve as a detent thereupon; and a top part including a securement ring adapted to secure said top part in operative relationship with a supporting element and engaging one surface of said element and a mounting ring engaging the other surface of said element and engaged by said securement ring and together with said securement ring defining an opening for the reception of said stud, said securement and mounting rings lying substantially flush with the respective surfaces of said elements, said mounting ring having a plurality of inwardly and radially directed spring arms located in said opening and each of said spring arms having a radial portion and an arcuately shaped terminal portion adapted to impinge on the underside of said land, said terminal portions lying in substantially the same plane as the uppermost of said rings whereby access to said arms to release the same cannot be had, and having the extreme end of the terminal portions disposed at right-angles to the radial portions thereof and adapted to abut on contiguous areas of said stud whereby vertical movement of said top part away from said bottom part will be prevented.

2. In a snap fastener adapted to be closed and to remain permanently closed against any attempt to dislodge the component parts thereof by ordinary means, the combination of: a bottom part including a vertically oriented stud having a base including securement means adapted to retain said base in operative engagement with a supporting element, said stud having a radially extending circular land at its upper extremity adapted to serve as a detent thereupon; and a top part including a securement ring adapted to secure said top part in operative relationship with a supporting element and engaging one surface of said element and a mounting ring engaging the other surface of said element and engaged by said securement ring and together with said securement ring defining an opening for the reception of said stud, said securement and mounting rings lying substantially flush with the respective surfaces of said element, said mounting ring having a plurality of inwardly and radially directed spring arms located in said opening and each of said spring arms having a radial portion and an arcuately shaped terminal portion adapted to impinge on the underside of said land, said terminal portions lying in substantially the same plane as the uppermost of said rings whereby access to said arms to release the same cannot be had, said terminal portions being bent upwardly at right angles to the radial portions of said arms and the ends thereof being disposed in planes parallel to the plane of said land whereby, when an axial load is imposed upon the top part to disengage it from the bottom part, abutment of said ends on said land will occur to prevent disengagement of said top part from said bottom part.

3. In a snap fastener adapted to be closed and to remain permanently closed against any attempt to dislodge the component parts thereof by ordinary means, the combination of: a bottom part including a vertically oriented stud having a base including securement means adapted to retain said base in operative engagement with a supporting element, said stud having a radially extending circular land at its upper extremity adapted to serve as a detent thereupon; and a top part including a securement ring adapted to secure said top part in operative relationship with a supporting element and engaging one surface of said element and a mounting ring engaging the other surface of said element and engaged by said securement ring and together with said securement ring defining an opening for the reception of said stud, said securement and mounting rings lying flush with the respective surfaces of said element, said mounting ring having a plurality of inwardly and radially directed spring arms located in said opening and each of said spring arms having a radial portion and an arcuately shaped terminal portion adapted to impinge on the underside of said land, said terminal portions lying in the same plane as the uppermost of said rings whereby access to said arms to release the same cannot be had, said terminal portions being bent upwardly into parallelism with said stud and the extreme ends thereof underlying said land and being disposed in planes parallel to said land whereby an abutting relationship of said extreme ends will occur when said top part is urged away from said bottom part to prevent disengagement of said top part from said bottom part.

4. In a snap fastener adapted to be closed and to remain permanently closed against any attempt to dislodge the component parts thereof by ordinary means, the combination of: a bottom part including a vertically oriented stud having a base including securement means adapted to retain said base in operative engagement with a supporting element, said stud having a radially extending circular land at its upper extremity adapted to serve as a detent thereupon; and a top part including a securement ring adapted to secure said top part in operative relationship with a supporting element and engaging one surface of said element and a mounting ring engaging the other surface of said element and engaged by said securement ring and together with said securement ring defining an opening for the reception of said stud, said mounting ring having a plurality of inwardly directed spring arms located in said opening and each of said spring arms having an arcuately shaped terminal portion adapted to impinge on the underside of said land, said terminal portions lying in the same plane as the uppermost of said rings whereby access to said arms to release the same cannot be had, said terminal portions being aligned in parallelism with said stud and having their extremities directed upwardly toward said land, said extremities being provided with ends disposed in planes parallel to the plane of said land whereby, when said top part is urged upwardly, said ends will abut upon said land to prevent disengagement of said top part from said bottom part.

References Cited in the file of this patent

UNITED STATES PATENTS

| | | |
|---|---|---|
| 311,460 | Allason | Feb. 3, 1885 |
| 384,007 | Vollmer | June 5, 1888 |
| 2,028,423 | Upham | Jan. 21, 1936 |
| 2,511,751 | Swett et al. | June 13, 1950 |
| 2,615,759 | Becker | Oct. 28, 1952 |

FOREIGN PATENTS

| | | |
|---|---|---|
| 509,342 | Canada | Jan. 18, 1955 |